United States Patent

[11] 3,522,763

[72] Inventor Milton S. Dietz
Lexington, Massachusetts
[21] Appl. No. 611,726
[22] Filed Jan. 25, 1967
[45] Patented Aug. 4, 1970
[73] Assignee Polaroid Corporation
Cambridge, Massachusetts
a Corp. of Delaware

[54] EXPOSURE CONTROL APPARATUS
12 Claims, 2 Drawing Figs.
[52] U.S. Cl........................................... 95/10, 95/53
[51] Int. Cl.............................................. G03b 7/08, G03b 7/16, G01j 1/46
[50] Field of Search............................................ 95/10c, 64a, 44, 53

[56] References Cited
UNITED STATES PATENTS

| | | | |
|---|---|---|---|
| 3,245,332 | 4/1966 | Kagan........................... | 95/53 |
| 3,063,354 | 11/1962 | Matulik......................... | 95/10C |
| 3,072,028 | 1/1963 | Lange............................ | 95/10C |
| 3,326,103 | 6/1967 | Topaz............................ | 95/10C |
| 3,336,850 | 8/1967 | Otani et al .................... | 95/10C |
| 3,344,724 | 10/1967 | Taguchi......................... | 95/10C |
| 3,382,786 | 5/1968 | Weidner et al ............... | 95/64 |

FOREIGN PATENTS

| | | | | |
|---|---|---|---|---|
| 1,429,539 | 1/1966 | France | Pentacon....... | 95/10C |

*Primary Examiner*— Norton Ansher
*Assistant Examiner*— Joseph F. Peters, Jr.
*Attorney*— Brown and Mikulka; Robert F. Peck and James L. Neal

ABSTRACT: Flash photographic exposure control apparatus for a camera having an electrically timed shutter. The apparatus is characterized in the use of two timing circuits for providing shutter interval control signals. One of these circuits is responsive to scene light and the other to object distance. The circuits simultaneously generate control signals, the first such signal reaching the trigger level of a shutter regulating trigger circuit establishes exposure interval.

Patented Aug. 4, 1970

3,522,763

INVENTOR.
Milton S. Dietz
BY Brown and Mikulka
and
James L. Neal
ATTORNEYS

U.S. PATENT 3,522,763
EXPOSURE CONTROL APPARATUS

BRIEF SUMMARY OF THE INVENTION

This invention contemplates the use of a shutter which, when used in the flash mode for photographing objects illuminated by a brief, brilliant flash of light, automatically regulates the exposure interval in accordance with either of two functions, the one being the level of illumination of the subject as sensed photoelectrically, the other being the distance between the subject and the source of illumination. In the embodiment to be described more fully hereinafter, the shutter automatically responds to both functions, terminating the exposure in accordance with one or the other, whichever is first to control the shutter.

In the use of photoelectrically controlled shutters for flash photography, subjects near the camera may be overexposed if the duration of the exposure interval is determined as a function of scene brightness, especially when the subject is adjacent a dark non-reflective background, outdoors, in a large room, or otherwise removed from any nearby light-reflective surface. However, in the use of this invention the shutter automatically responds to the distance between the camera and the subject to be photographed, which may be operative in response to focus adjustment, to effect a relatively brief exposure interval. This cuts short the exposure interval which would otherwise be established by the means responsive to scene brightness; thereby providing correct exposure.

On the other hand, in flash photography wherein light subjects are adjacent highly reflective surfaces or objects, overexposure might result if the exposure interval is determined in response to the distance between the camera and the subject. In this circumstance, however, the shutter automatically responds to scene brightness to effect a relatively short exposure interval, thus cutting short the interval which would otherwise be established by the control means responsive to focus adjustment, to thereby provide correct exposure.

As used in this disclosure, the term shutter is intended to be applicable to the portion of the camera that includes the shutter mechanism and the control means by which the latter is operated to effect exposure. One suitable shutter mechanism useful in connection with this invention comprises an aperture opening blade and an aperture closing blade, each movable between a blocking position and an unblocking position relative to the exposure aperture for controlling the passage of incident light therethrough. Prior to exposure, the opening blade is releasably held in blocking position against the action of a spring urging the blade to its unblocking position; while the closing blade is held in unblocking position against the action of a spring urging the latter blade to its blocking position.

The means by which such a shutter is operated may comprise a magnetic keeper mounted on the closing blade and a solenoid operatively associated with a magnetic core, the latter being so mounted on the camera housing that the keeper engages the core and completes a magnetic circuit when the closing blade is in unblocking position. Energization of the solenoid upon release of the opening blade creates a magnetic force on the keeper sufficient to maintain the closing blade in its unblocking position against the action of the spring acting thereon.

An electrical control circuit constructed in accordance with this invention may include two timing circuits and a voltage sensitive trigger circuit. Each timing circuit, when activated, generates a time variable voltage capable of reaching a level termed the trigger voltage in a period of time dependent upon the aforesaid variable function to which it is responsive. The circuit energizes the solenoid substantially at the same time the opening blade is released and both timing circuits are substantially simultaneously activated so that the solenoid is effective to maintain the closing blade in unblocking position as the opening blade moves toward its unblocking position to initiate exposure. The trigger circuit selectively responds to the voltage generated by the timing circuit which first establishes the requisite trigger voltage level for deenergizing the solenoid. Deenergization of the solenoid releases the closing blade which then moves toward blocking position to terminate exposure, whereby the duration of the exposure interval is a function of the variable function to which the controlling timing circuit is first responsive. If the time for the two blades to move between their respective terminal positions is the same, the exposure time is essentially equal to the interval during which the solenoid is energized.

A primary object of this invention is to provide a camera shutter for correctly controlling duration of the photographic exposure interval under a wide variety of exposure conditions when operating in the flash mode.

It is another object of this invention to provide photographic shutter control means comprising electric circuit means for regulating duration of the exposure interval in automatic response to the level of scene brightness as well as the distance from the camera to the subject being photographed.

It also is an object of this invention to provide electric circuit means for exposure control apparatus comprising first timing circuit means functionally responsive to the level of scene brightness, second timing circuit means functionally responsive to the focus adjustment of the camera, and trigger circuit means responsive to that timing circuit means which first acts to control the duration of the exposure interval.

Other objects of the invention will in part be obvious and will in part appear hereinafter.

BRIEF DESCRIPTION OF THE DRAWINGS

The invention accordingly comprises the apparatus possessing the construction, combination of elements and arrangement of parts which are exemplified in the following detailed disclosure of a preferred embodiment taken in connection with the accompanying drawings wherein.

DETAILED DESCRIPTION

Figure 1:
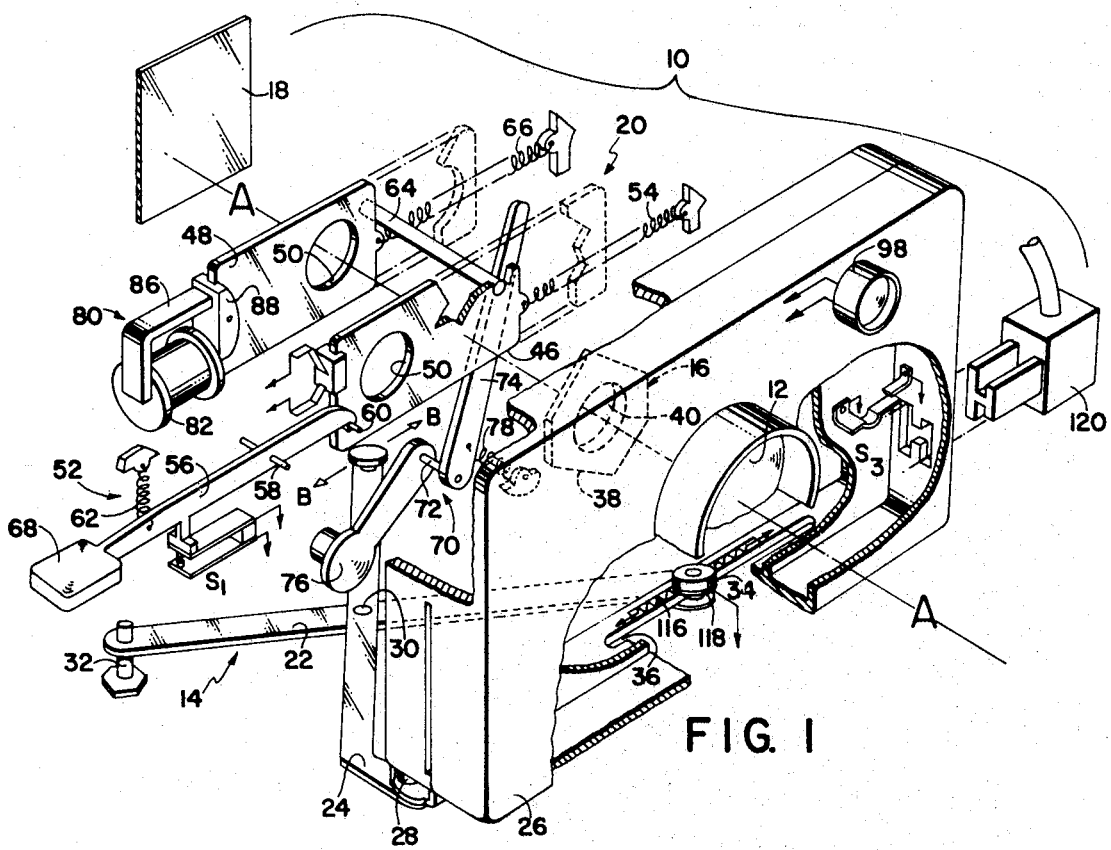
FIGURE 1 illustrates in exploded perspective components of a photographic camera with a shutter mechanism particularly adapted for use with the present invention.

Referring now to FIGURE 1, camera 10 is shown schematically as including lens 12, diaphragm means 16, focusing means 14, shutter mechanism 20, and film 18 located at the camera focal plane. Lens 12 is positioned for receiving light from a scene to be photographed and directing it through an aperture in diaphragm means 16. Focusing means 14 positions lens 12 and diaphragm means 16 relative to the film plane for focusing light from the scene onto film 18 to form an image thereon. Exposure is effected by proper operation of shutter mechanism 20, interposed in the optical path of the light.

Focusing means 14 includes arms 22 and 24. Arm 24 is pivotally mounted to housing 26 at 28 and to arm 22 at 30. One end of arm 22 is pivotally mounted upon pin 32 fixed on a portion of the camera body; the opposite end of arm 22 includes carriage 34 by which it is slidably mounted in slot 36. Focusing movement is effected by movement of arm 24 in a direction along arrow B-B, in accordance with the distance from the camera to the subject being photographed. Diaphragm 16 may take the form of an apertured plate 38 mounted on the camera housing and forming an exposure aperture 40 along the optical axis A-A of the camera.

Figure 2:
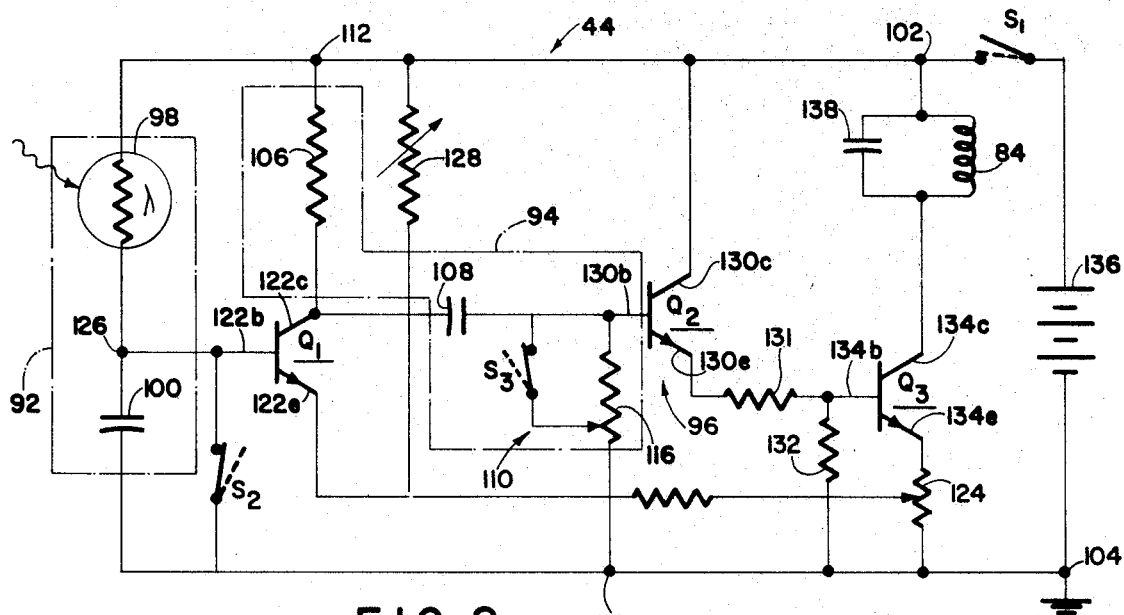
FIGURE 2 is a schematic electrical diagram of a control circuit for governing the operation of the shutter mechanism of FIGURE 1.

The shutter may include shutter mechanism 20 shown in FIGURE 1, and shutter control means 44 shown in FIGURE 2. The shutter mechanism 20 may include a pair of planar, opaque blades 46 and 48 each provided with an exposure orifice 50, and mounted in tracks (not shown) so as to be normal to the optical axis, and reciprocable between terminal positions into intersection with the optical axis. Each of the blades has one terminal position at which the solid portion overlies and totally blocks the exposure aperture in diaphragm means 16 (closed position), and another terminal position at which the exposure orifice is aligned with the exposure aperture (open position). Between these two terminal positions, each blade has an intermediate position at which it covers only a portion of the exposure aperture. It may be assumed that the intermediate position at which half of the exposure aperture area is covered is in the position at which exposure is either initiated or terminated as the case may be. The blade that causes exposure to be initiated is called the "opening" blade. The terminal position at which the opening blade is in the closed position is termed "blocking" position, while the position intermediate the two terminal position of the open blade at which the initial exposure is termed the "unblocking" position. Conversely, the blade that causes exposure to be terminated is called the "closing" blade. The terminal position at which the closing blade is in the open position is termed the "unblocking" position, while the position intermediate the two terminal positions of the closing blade at which it terminates exposure is termed the "blocking" position.

Prior to initiation of exposure, the blades are as shown in the solid lines of FIGURE 1, inspection of which will indicate that releasable coupling means 52 is engaged with opening blade 46 to hold the latter in blocking position against the bias of spring means 54 which urges the blade toward ublocking position. Coupling means 52 includes latch 56 pivotally mounted on pin 58 and engages with latch pin 60 attached to blade 46. Latch spring 62 engaged with latch 56 urges the latter into latching contact with pin 60. Reset bar 64 is rigidly attached to the end of blade 46 remote from the end containing exposure orifice 50, and extends normal thereto into the path of movement of closing blade 48. When the opening blade is held in blocking position by coupling means 52, bar 64 is effective to engage blade 48 and to maintain the latter in the open position against the bias of spring means 66 urging the closing blade toward its blocking position. As can be seen from the drawing, bar 64 does not interfere with the independent movement of opening blade 46 to its open position.

Such movement takes place upon manual depression of end portion 68 of latch 56, which rotates the latter about pivot 58 out of engagement with pin 60. Upon disengagement of coupling means 52 from opening blade 46, the latter moves out of blocking position toward open position, and bar 64 is no longer effective to maintain the closing blade 48 in its open position. However, initial movement of opening blade 46, in response to the disengagement of coupling means 52 therefrom, is effective to cause shutter control means 44, in a manner to be described later, to retain closing blade 48 in its open position for a preselected period of time depending on certain exposure functions. Since the opening blade moves to unblocking position while the shutter control means releasably retains the closing blade in open position, exposure is initiated. In other words, the shutter control means is so operably associated with the shutter mechaniam, that the latter is caused to initiate exposure in response to actuation of the former. At the end of said preselected period of time, shutter control means 44 causes closing blade 48 to be released thus terminating exposure as the latter is moved from open to blocking position by the action of bias spring means 66.

After exposure is terminated, blades 46 and 48 are in the postion shown by the broken lines of FIGURE 1. That is to say, blade 46 is in open position and blade 48 is in its closed position, with reset bar 64 again engaged with blade 48. Having completed the exposure cycle, the blades are returned to their normal positions by reset mechanism 70 which includes reset shaft 72 rotatably mounted on the camera housing, reset lever 74 rigidly fixed to one end of shaft 72 and manual reset actuator 76 fixed the other end of the shaft. Spring means 78 biases lever 74 to its normal position out of the path of movement of reset bar 64. However, the manual rotation of lever 74 against spring 78 achieved by the manual rotation of actuator 76 after exposure is terminated, causes lever 74 to engage bar 64 and move both blade 46 and blade 48 back to their normal pre-exposure positions wherein the opening blade is in blocking position and the closing blade is in open position, the blades being held there by the action of coupling means 52. Upon release of actuator 76, lever 74 returns to its normal position, and the mechanism is ready for the next exposure cycle. If desired, the manual rotation of actuator 76 can be coupled to a film indexing mechanism.

The shutter control means may include shutter operator means 80 actuatable at the time of initiation of exposure, and deactuatable after said preselected period of time to cause the shutter means to terminate exposure, as previously mentioned. Specifically, operator means 80 may take the form of an electromagnet 82 which has solenoid 84 (see FIG. 2) wound around one leg of U-shaped core 86, the free ends of which are coplanar and cooperable with magnetizable keeper 88 mounted on closing blade 48 when the latter is in open position. Core 86 and keeper 88, in such case, define a magnetic circuit of a particular reluctance such that a preselected current in the solenoid circuit is sufficient to establish an attractive force between the core 86 and the keeper 88 that exceeds the separating force exerted on the closing blade by the biasing action of spring means 66. This attractive force is also sufficient to resist dynamic loads, such as those due to the shock of the bottoming of the opening blade.

As shown in FIG. 2, control means 44 comprises first timing circuit 92, second timing circuit 94, and trigger circuit 96, selectively responsive to the timing circuits, for energizing and deenergizing solenoid 84 of electromagnet 82.

The first timing circuit 92 includes a photoresponsive element 98, such as a cadmium sulfide photocell or the like exposed to light from the scene being photographed and having a resistance functionally related to the level of scene brightness, and capacitor 100 connected in series between terminals 102 and 104 of the shutter timing apparatus. Circuit 92 constitutes a conventional integrator circuit, connected across connection 102 and connection 104.

The second timing circuit 94 incudes resistor 106, capacitor 108 and variable resistor means 110 connected in series between terminals 112 and 114. Variable resistor means 110 may take the form of the resistor 116, also shown in FIGURE 1, arranged along slot 36 in the camera housing, with sliding contact 118 mounted on carriage 34. Switch means S3 connects the sliding contact 118 to capacitor 108. In the embodiment shown, sliding contact 118 is mounted for movement along resistor 116 in response to focusing movement of the camera lens. Switch means S3 is biased open, subject to be closed by insertion into the camera of plug 120 of scene illumination means (not shown). When switch S3 is open, the full value of resistor 116 obtains; when S3 is closed the resistance value of resistor 116 obtained is variable and dependent upon the position of sliding contact 118.

In discussing second timing circuit 94, it is necessary to consider operation according to two modes. According to the first mode, photographic exposure takes place under conditions of varying light level, such as that resulting when photoflash illumination is used. Connecting plug 120 of the photoflash unit closes switch S3 so that the value of resistance 116 is variable with focus. According to the second mode, photographic exposure takes place under steady state lighting conditions, plug 120 is not connected and the full resistance value of resistor 116 is obtained.

It should be observed that intensity of photoflash illumination decreases with increase in the distance from the camera to the subject being photographed in the typical situation where the photoflash unit is mounted upon the camera. Relatively long exposure intervals are thus required for relatively dimly lit subjects in the remote photoflash range. Accordingly, the functional relationship between the focusing means and resistance means 110 is such that focus adjustment for subjects a relatively great distance from the camera positions contact 118 along resistor 116 for relatively high resistance, whereas focus adjustment for a subject relatively close to the camera positions contacts 116 along resistor 118 for a relatively low resistance.

Trigger circuit 96 may take the form of a three transistor modified Schmitt type circuit selectively responsive to the output voltage from timing circuit 92 or timing circuit 94. Trigger circuit 96 has an input that is a normally not-conducting stage, and includes transistor $Q_1$; and an output that is a normally conducting stage, and includes transistors $Q_2$ and $Q_3$.

Transistor $Q_1$ has base, collector and emitter electrodes 122b, 122c and 122e, respectively, with electrode 122c connected through load resistor 106 of timing circuit 94 to terminal 102, with electrode 122e connected to terminal 104 through common emitter resistor 124, and with electrode 122b connected to connection 126 such that photoconductive element 98 of timing circuit 92 defines for $Q_1$ a base bias resistor. The base of transistor $Q_1$ is initially grounded through switch S2 across capacitor 100 and the emitter is coupled to terminal 102 through bias resistor 128. Transistor $Q_2$ has base, collector and emitter electrodes 130b, 130c and 130e respectively, with electrode 130c connected directly to terminal 102 and electrode 130e connected to terminal 104 through load resistors 131 and 132. The base of transistor $Q_2$ is A. C. coupled to the collector of transistor $Q_1$ by the cut-off capacitor 108 in timing circuit 94. Transistor $Q_2$ is thus an emitter-follower for driving transistor $Q_3$, the latter having base, collector and emitter electrodes 122b, 134c and 134e respectively. The base of transistor $Q_3$ is coupled to transistor $Q_2$ through load resistor 131 while the emitter is coupled to terminal 104 through common emitter resistor 124. The collector of transistor $Q_3$ is coupled to terminal 102 through solenoid 84 which constitutes the load for this transistor. While the stages of circuit 96 have been characterized as "normally not-conducting" and "normally conducting", it should be obvious that this characterization is applicable only if a voltage source is applied across terminals 102 and 104.

In order to make a photographic exposure, an operator depresses end portion 68 of lever 56 (see FIGURE 1). Switch operating arm 57 engages the contacts of switch S1 before the rotation imparted to lever 56 effects its disengagement from pin 60, closing the contacts and applying the potential of battery 136 across terminals 102 and 104. The battery is applied across the terminals as long as the operator maintains lever 56 in its depressed state, and since the human reaction time in depressing and releasing portion 68, and the inertial delay of the lever in returning to its normal position substantially exceeds the longest exposure likely to be used under normal "snap-shot" conditions, the contacts of switch S1 are closed for at least as long as the correct exposure time.

When switch S1 is initially closed, switch S2 is closed, grounding first timing circuit 92, so that the flow of current through resistors 128 and 124 establishes a reverse bias condition on the base-emitter junction of transistor $Q_1$ and the latter is cut off.

Second timing circuit 94 is activated at the instant S1 is closed and establishes a voltage at electrode 130b of transistor $Q_2$, the value of which depends upon the resistance of resistors 106 and 116 in timing circuit 94. This voltage varies with time starting with switch S1 closed at time zero. At the instant S1 is closed, timing circuit 94 responds as if capacitor 108 were not present and the voltage at electrode 130b jumps to a value determined by what is essentially a voltage divider network of resistors 106 and 116 in series as previously described. Transistor $Q_2$ is properly biased and conducts, the base current being transient in nature and tending to zero as the voltage at the base of transistor $Q_2$ seeks its equilibrium value. The voltage decays exponentially during an interval of time depending upon the sum of resistances 106 and 116 and the capacitance of capacitor 108, the value of resistance 116 being selectively controlled in accordance with focus adjustment of the camera. Thus, the transient voltage established at the base of transistor $Q_2$ when switch S1 is closed is characterized by a rate of decay which is functionally related to the aforesaid focus adjustment.

With the proper selection of circuit parameters, the transient current in the base of transistor $Q_2$ permits emitter current to flow such that transister $Q_3$ is properly biased for conduction. Thus, when switch S1 is closed, solenoid 84 is instantaneously energized to provide in the magnetic circuit of core 86 and keeper 88, a magnetic induction sufficiently large to create a force on the keeper that is greater than the bias of spring 66, and the closing blade is thus held in its unblocking position independently of the opening blade.

Eventually the decaying voltage at 130b reaches a level termed the trigger voltage where the base current can no longer support conduction of transistor $Q_2$ and conduction ceases thereby driving transistor $Q_3$ to cutoff and deenergizing the solenoid, unless the operation of transistor $Q_1$, responding to the action of timing circuit 92, has already accomplished this in a manner to be subsequently described. The deenergization of solenoid 84 effects release of closing blade 48 so that transition from unblocking to blocking position occurs to terminate exposure.

Since the rate of voltage decay at base electrode 130b is functionally related to the focus adjustment of the camera and the exposure interval is established by the time interval during which the aforesaid voltage decay takes place, the exposure interval is functionally related to the aforementioned focus adjustment.

Consideration will next be given to the operation of first timing circuit 92. This timing circuit is activated by the opening of switch S2 when switch S1 is closed, a condition obtained in response to movement of opening blade 46 toward its unblocking position when lever 56 is depressed and disengaged from pin 60. Activated timing network 92 generates a time variable voltage at connection 126 which is functionally related to the resistance of photoresponsive element 98, which resistance is variable in accordance with light received from the scene being photographed and incident thereon.

After switch S2 is opened, the voltage at 126 increases during a time interval which is a function of the resistance of element 98, and thus of light received from the subject being photographed. This voltage increases to the trigger level for transistor $Q_1$, at which level normally not-conducting transistor $Q_1$ is forward biased into conduction. When transistor $Q_1$ is forward biased into conduction, it conducts heavily, drawing collector current and lowering the transient voltage at electrode 130b to the trigger voltage level for transistor $Q_2$, at which level normally conducting transistor $Q_2$ is reverse biased to its not-conducting state. This change is reflected at electrode 134b of transistor $Q_3$ by reducing the forward bias on transistor $Q_3$ and reducing current in resistor 124. This causes transistor $Q_1$ to conduct to a greater extent with the result that the regenerative feedback between the stages causes conduction to switch rapidly. Thus transistor $Q_3$ abruptly ceases conducting and the solenoid 84 is deenergized. Capacitor 138 coupled across the solenoid prevents the voltage induced therein, due to the changing current in the solenoid and changing flux in the magnetic field, from damaging $Q_3$. The closing blade is thus released for movement to its terminal blocking position, if the action of timing circuit 94, previously described, has not first effected release of the closing blade.

It will be seen from the foregoing description that the described embodiment of the invention accomplishes the above-mentioned objects by providing an exposure control means for regulating exposure interval in automatic response to the level of scene brightness or the distance from the camera to the subject being photographed, whichever function first terminates exposure.

Since certain changes may be made in the above apparatus without departing from the scope of the invention herein involved, it is intended that all matter contained in the above description or shown in the accompanying drawing shall be interpreted as illustrative and not in a limiting sense.

I claim:

1. Exposure control apparatus for a camera having an exposure aperture and means to adjustably position an element of said camera in accordance with the distance from the camera to the subject being photographed, said exposure control apparatus comprising:

(a) shutter means for unblocking and blocking said exposure aperture to establish an exposure interval;

(b) first electrical timing circuit means for generating a time variable voltage capable of reaching a level termed the trigger voltage during an interval of time dependent upon the level of scene brightness;

(c) second electrical timing circuit means for generating a time variable voltage capable of reaching said level termed the trigger voltage during an interval of time dependent upon the position of said element; and (d) circuit means automatically responsive to the electrical timing circuit which first generates a voltage attaining said trigger voltage level for controlling the operation of said shutter means to regulate the duration of said exposure interval.

2. Apparatus according to claim 1 wherein said first circuit means comprises photoresponsive means arranged to receive illumination from the scene to be photographed and capacitor means connected in series with said photoresponsive means.

3. Apparatus according to claim 1 wherein said second circuit means comprises capacitor means, resistor means, and means for varying the resistance value of said resistor means in accordance with the position of said adjustable element.

4. Apparatus according to claim 1 wherein said means to adjustably position an element of said camera comprises focusing means for said camera.

5. Exposure control apparatus for a camera having an exposure aperture, shutter means for selectively blocking and unblocking the passage of light through said exposure aperture, photoresponsive means arranged to receive illumination from the scene to be photographed and means to adjustably position an element of said camera according to the distance from the camera to the subject to be photographed, comprising:

(a) means for effecting unblocking movement of said shutter means;

(b) first means capable of controlling blocking movement of said shutter means as a function of the amount of light incident on said photoresponsive means;

(c) second means capable of controlling blocking movement of said shutter means as a function of the position of said adjustable element, independently of said amount of light incident on said photoresponsive means; and (d) means automatically responsive to either said first or said second blocking movement control means for effecting blocking movement of said shutter means.

6. Exposure control apparatus for a camera having an exposure aperture and means adjustable in accordance with the distance from the camera to the subject being photographed, said exposure control apparatus comprising:

(a) shutter means for blocking and unblocking said exposure aperture to establish an exposure interval;

(b) means for effecting aperture unblocking movement of said shutter means to initiate said exposure interval;

(c) a first timing circuit for generating a time variable voltage capable of reaching a level termed the trigger voltage during an interval of time functionally related to the level of scene brightness;

(d) a second timing circuit for generating a time variable voltage capable of reaching said level termed the trigger voltage during an interval of time functionally related to the adjustment of said adjustable means, independently of the level of scene brightness; and (e) a voltage sensitive trigger circuit, automatically responsive to said time variable voltage which first establishes said trigger voltage, for controlling aperture blocking movement of said shutter means and thereby termination of said exposure interval as a function of either the level of scene brightness or the adjustment of said adjustable means according to whether said first timing circuit or said second timing circuit, respectively, generates a time variable voltage which first reaches the trigger voltage level.

7. Exposure control apparatus according to claim 6 wherein:

(a) said means adjustable in accordance with the distance from the camera to the subject being photographed comprises focusing means for said camera; and (b) said second timing circuit includes a resistor variable in accordance with the focus adjustment of said focusing means for varying the interval of time required for said second timing circuit to generate a voltage reaching said trigger voltage level.

8. Exposure control apparatus for a camera having an exposure aperture and means adjustable in accordance with the distance from the camera to the subject being photographed for variably focusing said camera, said exposure control apparatus comprising:

(a) shutter means for unblocking and blocking said exposure aperture to establish an exposure interval;

(b) a first timing circuit comprising photoresponsive means arranged to receive illumination from the scene to be photographed and capacitor means connected in series with said photoresponsive means for generating a first time variable voltage capable of reaching a level termed the trigger voltage during an interval of time functionally related to the level of scene brightness;

(c) a second timing circuit comprising capacitor means, resistor means and means for varying the resistance value of said resistor means in accordance with the adustment of said adjustable means for generating a second time variable voltage capable of reaching said level termed the trigger voltage during an interval of time dependent upon camera focus adjustment; and (d) trigger circuit means automatically responsive to the electrical timing circuit which first generates a voltage attaining said trigger voltage level for controlling the operation of said shutter means to thereby regulate the duration of said exposure interval as a function of either the level of scene brightness or the camera focus adjustment according to whether said first timing circuit or said second timing circuit, respectively, generates a time variable voltage which first reaches the trigger voltage level.

9. Exposure control apparatus for a camera having an exposure aperture said exposure control apparatus comprising:

(a) means for regulating the passage of light through said aperture;

(b) first electrical circuit means for generating a first time variable voltage capable of reaching a level termed the trigger voltage during an interval of time functionally related to a first variable;

(c) second electrical circuit means comprising a capacitor and variable resistance means, said resistance means being variable in accordance with the distance between said camera and a photographic subject, for generating a second time variable voltage capable of reaching said level termed the trigger voltage; and (d) circuit means automatically responsive to either said first electrical circuit means or said second electrical circuit means according to which is first to generate a voltage reaching the trigger voltage level for influencing the operation of said light regulating means either in accordance with said first variable or in accordance with said value of resistance.

10. Exposure control apparatus according to claim 9 wherein said camera includes focusing means, further comprising means for varying the value of said variable resistance means in response to adjustment of said focusing means.

11. Exposure control apparatus according to claim 9 wherein said first electrical circuit means comprises a capacitor and resistance means.

12. Exposure control apparatus according to claim 11 wherein said first electrical circuit means is photoresponsive.